(12) United States Patent
Wang et al.

(10) Patent No.: US 7,673,450 B2
(45) Date of Patent: Mar. 9, 2010

(54) INTEGRATED TORQUE CONVERTERS AND ASSEMBLIES

(75) Inventors: Wei Wang, Irvine, CA (US); Philip George, Wooster, OH (US); Christopher Shamie, Wadsworth, OH (US); Bhaskar Marathe, Wooster, OH (US)

(73) Assignee: LuK Lamellen und Kupplungsbau Betilingungs, Buehl (DE)

( * ) Notice: Subject to any disclaimer, the term of this patent is extended or adjusted under 35 U.S.C. 154(b) by 794 days.

(21) Appl. No.: 11/492,734

(22) Filed: Jul. 25, 2006

(65) Prior Publication Data
US 2009/0113885 A1 May 7, 2009

Related U.S. Application Data

(60) Provisional application No. 60/703,208, filed on Jul. 28, 2005.

(51) Int. Cl.
*F16D 33/00* (2006.01)
*F16D 33/20* (2006.01)

(52) U.S. Cl. .......................................... 60/367; 60/330

(58) Field of Classification Search ................... 60/330, 60/364, 367; 416/197 C, 180, 228
See application file for complete search history.

(56) References Cited

U.S. PATENT DOCUMENTS

| 2,632,397 | A | * | 3/1953 | Jandasek | ...................... 60/367 |
| 3,663,995 | A | | 5/1972 | Somann | |
| 6,354,413 | B2 | | 3/2002 | Heller et al. | |
| 6,360,533 | B1 | * | 3/2002 | Turner et al. | ................... 60/364 |
| 6,371,728 | B1 | * | 4/2002 | Gomi et al. | ............. 416/197 C |
| 6,494,303 | B1 | | 12/2002 | Reik et al. | |
| 6,814,194 | B2 | | 11/2004 | Back et al. | |
| 6,886,330 | B1 | * | 5/2005 | Turner | ......................... 60/364 |

FOREIGN PATENT DOCUMENTS

DE     3931427     4/1990

* cited by examiner

*Primary Examiner*—Michael Leslie
(74) *Attorney, Agent, or Firm*—Simpson & Simpson, PLLC (57) ABSTRACT

More efficient, economic vehicular torque converters comprising novel integrated one-piece turbine/impeller blade-core assemblies with innovative fluid coupling means for greater torque capacities.

9 Claims, 7 Drawing Sheets

INTEGRATED TORQUE CONVERTERS AND ASSEMBLIES

CROSS REFERENCE TO RELATED APPLICATION

This application claims the benefit of U.S. Provisional Application 60/703,208, filed Jul. 28, 2005.

TECHNICAL FIELD

The present invention relates generally to torque converters, and more specifically, to novel vehicular torque converters having turbine and impeller assemblies that employ more economic, integrated structural features for fluid coupling and increased torque capacity.

BACKGROUND OF THE INVENTION

Torque converters are positioned between the engine and transmission case of motorized vehicles. They play an important role by controlling on/off power from the engine to the rest of the drive train. In addition, they provide torque multiplication, dampen engine vibration and assure smooth start-ups and speed changes.

A typical torque converter assembly comprises as principal components, an impeller or pump, a turbine and a stator positioned between the turbine and pump. The turbine and pump are seated in opposing shells and rotate therewith. The torque converter pump is connected to the engine, and as the pump rotates energy is transmitted to the turbine by forcing fluid against turbine blades causing their rotation. The turbine, which is connected to the transmission, transmits torque to vehicle wheels. The torque converter pump also turns the transmission oil pump. The stator positioned between the turbine and impeller operates to redirect the flow of fluid allowing the pump to rotate with less torque, so as to provide torque multiplication.

Heretofore, when larger torque capacities were required, the usual practice was to increase the size of the torque converter. This however, has resulted in economic tradeoffs. Also contributing to overall higher costs has been the industry practice of manufacturing core assemblies for torque converters as multiple separate components requiring additional manufacturing steps.

While the foregoing practices have been effective in meeting needs for torque converters with greater torque capacities, there still remains an unfulfilled need for a solution to the problem of increasing torque capacity and overall values of torque converter performance, but with fewer significant economic trade-offs.

SUMMARY OF THE INVENTION

Accordingly, it has now been found that torque converter capacity can be increased more economically by fabricating converter turbine cores as integrated assemblies. That is to say, instead of fabricating torque converter blades and cores as independent structures, the two structures are integrated during the manufacturing process eliminating one or more fabrication steps, for example. The integration of blades and cores simplifies the assembling process for enhanced cost savings. Integration also eliminates the need for multiple sets of forming dies, normally required. Importantly, integration, while achieving improved economics, is also capable of increasing torque capacity by inducing fluid coupling. Other advantages of the novel integrated turbine/impeller assemblies include a more robust design for greater strength and durability.

It is therefore one principal object of the invention to provide novel integrated torque converter blade and core assemblies comprising a generally crescent shaped blade body having an outer convex edge, and an inner concave edge. The integrated structure includes a truncated core portion engaged with the inner concave edge of the blade body to form an "integrated torque converter blade-core segment". The latter expression is generic, and intended to include both integrated turbine blade-core segments and integrated impeller or pump blade-core segments.

It is yet a further object of the invention to provide integrated torque converter assemblies, wherein the turbine, for example, possesses structural features for inducing fluid coupling. The core portion of a converter blade is generally incurved or concave shaped forming a void or space filled with transmission fluid. Such space in conventional turbine and impeller cores is normally unused, or otherwise wasted space. These inventors, however, discovered the capacity of a torque converter can be increased by inducing fluid coupling in this otherwise structurally "empty" space.

Thus, it is still a further principal object of the invention to provide the truncated core interior of the integrated torque converter blade segment with structural means, such as a baffle or barrier member suitable for inducing fluid coupling. Baffles and barriers, for example that induce fluid coupling and concomitant increased torque capacity may even be integral with the truncated core portion of the converter blade segment.

Importantly, the shape or configuration of the barrier or baffle member may be any design or curved shape that provides overall efficient fluid coupling performance in the core interior. The particular configuration of the fluid coupling element presented in the drawings is but one representative example of a suitable baffle design.

It is yet a further principal object of the invention to provide a torque converter turbine, wherein a plurality of adjacent integrated torque converter blade-core segments, as previously discussed, are adjoined through their truncated cores to form integrated turbine-core assemblies. That is, unlike conventional turbine-core assemblies wherein individual blades with tabs are installed onto prefabricated cores having slotted openings for receiving the tabs of torque converter blades, the integrated torque converter blade segments of this invention are adjoined to adjacent segments through their truncated cores to form fully integrated turbine blade-core assemblies, as well as integrated impeller blade-core assemblies. Thus, the integrated turbine core assemblies, and pump core assemblies of this invention achieve further cost advantages by eliminating conventional independent slotted torque converter cores for mounting tabbed turbine and impeller blades.

While the foregoing objects, features and advantages of the invention have been described mainly in connection with increasing torque capacity of turbines, this is for purposes of convenience only. And, it is to be understood the same objects, features and advantages apply equally to impellers for torque converters for increasing pump capacities as well.

It is still a further principal object of the invention to provide for novel torque converters per se, generally for use whenever extra torque capacity is required in motorized vehicles. The invention is especially well adapted for use in motor vehicles when start-up torque ratio is a not a premium requisite for a given vehicle.

The torque converters of the invention are characterized by at least an integrated turbine-core assembly and integrated impeller-core assembly for increased torque capacities. The turbine core assembly and the impeller core assembly each comprise a plurality of the integrated torque converter blade-core segments. As previously pointed out, the segments have a generally crescent shaped blade body with an outer convex edge, an inner concave edge and a truncated core engaged with the inner concave edge of the blade body. A plurality of adjacent integrated blade segments adjoined through their truncated cores form the integrated turbine-core and integrated impeller-core assemblies. The innovative torque converters comprising the integrated turbines and impellers of the invention include means for effecting fluid coupling for increased torque capacity, such as through rigid tabs of suitable design which perform as barriers or baffles for inducing fluid coupling in the interior region of their respective cores.

As part of the torque converters of the invention, including the integrated torque converter blade segments assembled into turbines and impellers, they are equipped with slotted shells for seating the integrated and assembled turbines and impellers into unitized components for use in torque converters of the invention, especially when requiring higher torque capacities. The integrated, higher capacity torque converters of the invention are suitable for use with most all vehicular transmissions, including, but not limited to automotive applications, but also commercial vehicles including buses, trucks, military vehicles, and the like.

These and other features and advantages will become more apparent from a reading of the detailed description below.

BRIEF DESCRIPTION OF THE DRAWINGS

The nature and mode of operation of the present invention will now be more fully described in the following detailed description of the invention taken with the accompanying drawing figures, in which.

DESCRIPTION OF THE PREFERRED EMBODIMENTS

Figures 1, 2, 3:
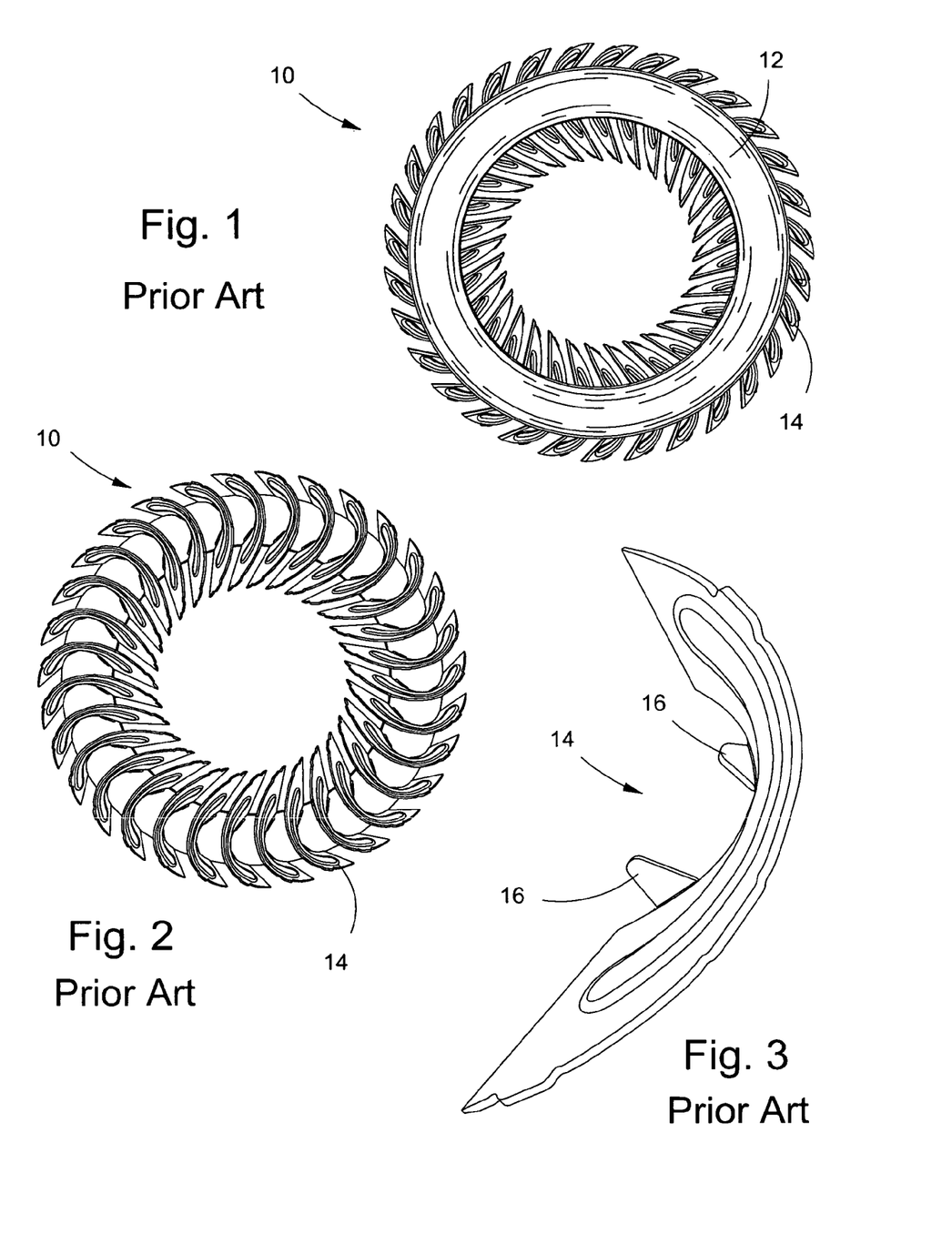
FIG. 1 of the drawings is a frontal view of a conventional torque converter blade assembly illustrating a continuous, empty, non-integrated core, blade design associated with the prior art.
FIG. 2 of the drawings is a backside view of the non-integrated torque converter blade assembly of FIG. 1.
FIG. 3 of the drawings is an isometric view of a torque converter blade employed in the non-integrated core assemblies of FIGS. 1 and 2, illustrating the tabs for engaging with slots of a torque converter core.

Turning first to FIGS. 1-3, illustrated are conventional, non-integrated turbine assemblies 10 for torque converters, frontal and rear views, FIGS. 1 and 2, respectively, and an enlarged blade 14 (FIG. 3) employed in the turbines of FIGS. 1-2. FIG. 1 illustrates in the frontal view of this non-integrated turbine a core 12, which is a continuous incurved or concaved ring. The interior of the incurved ring while filled with fluid is devoid of obstructions or structural discontinuities. Core 12, however, contains a series of slots (not shown) for receiving mounting tabs 16 of turbine blade 14. Such state-of-the-art nonintegrated turbine assemblies 10, while generally reliable, lack the improved structural features for effectuating the desired fluid coupling for increasing torque converter capacity economically like that of the instant invention.

Figure 4:
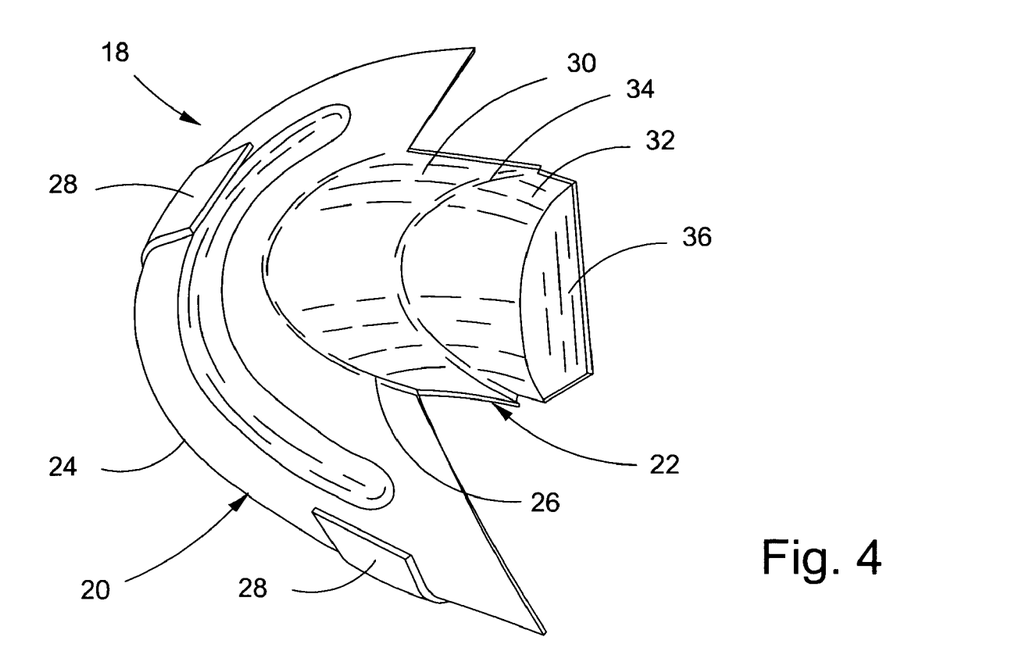
FIG. 4 is an isometric backside view of a representative integrated torque converter blade-core segment, either turbine or impeller, of the invention with an end plate or tab member as means for inducing fluid coupling for increased torque capacity.

The fundamental building-block of the instant invention is illustrated beginning with FIG. 4, which is a back view of an integrated turbine blade-core segment 18. Segment 18 is comprised of blade portion 20 and core portion 22. Segments 18 may be fabricated using methods familiar among ordinary skilled artisans, wherein, for example, an integral one-piece blade-core structure is fabricated, or alternatively, blade and core fabricated as separate components and brazed or welded into one-piece structures in a sequence of steps.

Figure 6:
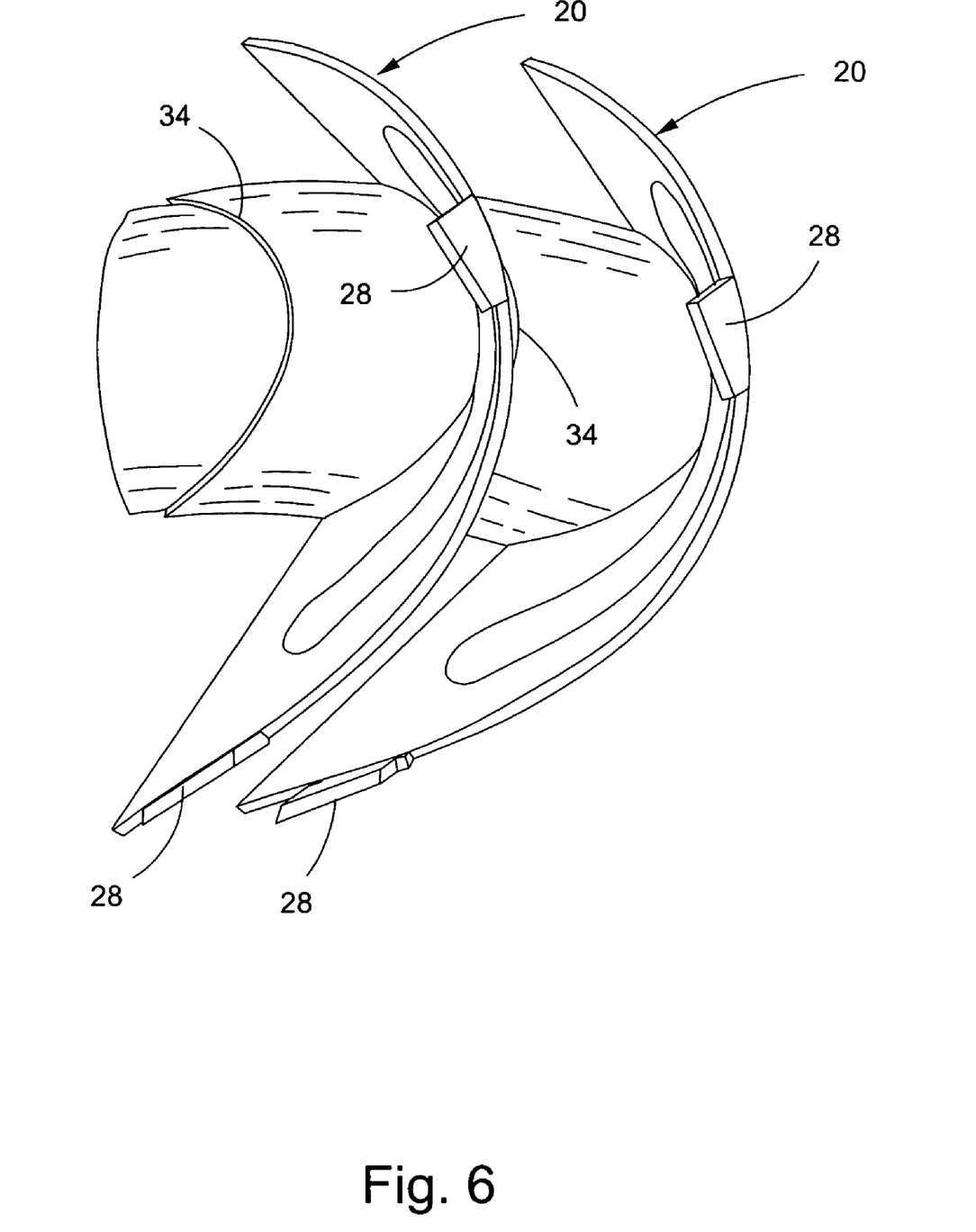
FIG. 6 is a backside view of a plurality of the integrated converter blade segments of the invention with overlapped truncated core segments engaged and bonded to one another in an early stage fabrication of a torque converter turbine.

Blade 20 is generally crescent or crescentic in shape, or in other words, possesses the appearance of a moon-like fractional phase with a generally rounded outer convex edge 24 and an inner inwardly curved or concave edge 26. Blade portion 20 is also preferably rounded or bowed generally along its longitudinal axis, as best illustrated by FIG. 6, and comprises one or more, usually dual tabs 28 for affixing to a turbine shell.

It will be observed that core portion 22 is preferably tiered into two or more layers 30-32 in a stepped pattern, wherein margin 34 performs as a demarcation between the upper tier portion 30 and lower tier 32. Margin 34 is especially useful by aiding in the assembly process of the turbine, wherein individual integrated blade-core segments are conveniently overlapped with the next adjacent segment whereby the truncated core portion of the next adjacent segment is butted-up against margin 34 prior to brazing, for example, for uniform spacing between turbine blade-core segments, as best illustrated by FIGS. 5-6.

The integrated turbine blade-core segments 18 preferably include at least one fluid coupling element 36, which is capable of coupling with transmission fluid for increasing torque capacity. Preferably, element 36 consists of any suitable rigid structure forged as an integral or nonintegral tab positioned principally in the inwardly curved region of the core. Representative examples include a functional baffle, rounded tab, wall, partition, screen member, or separator of suitable design, to name but a few. Fluid coupling element 36 can be integral with the truncated core or affixed to the core during fabrication. Usually, each core segment of the integrated turbine blade-core may have at least one fluid coupling element 36. However, the invention contemplates integrated turbines wherein not each and every truncated blade-core segment is necessarily equipped with a fluid coupling element 36.

Figure 5:
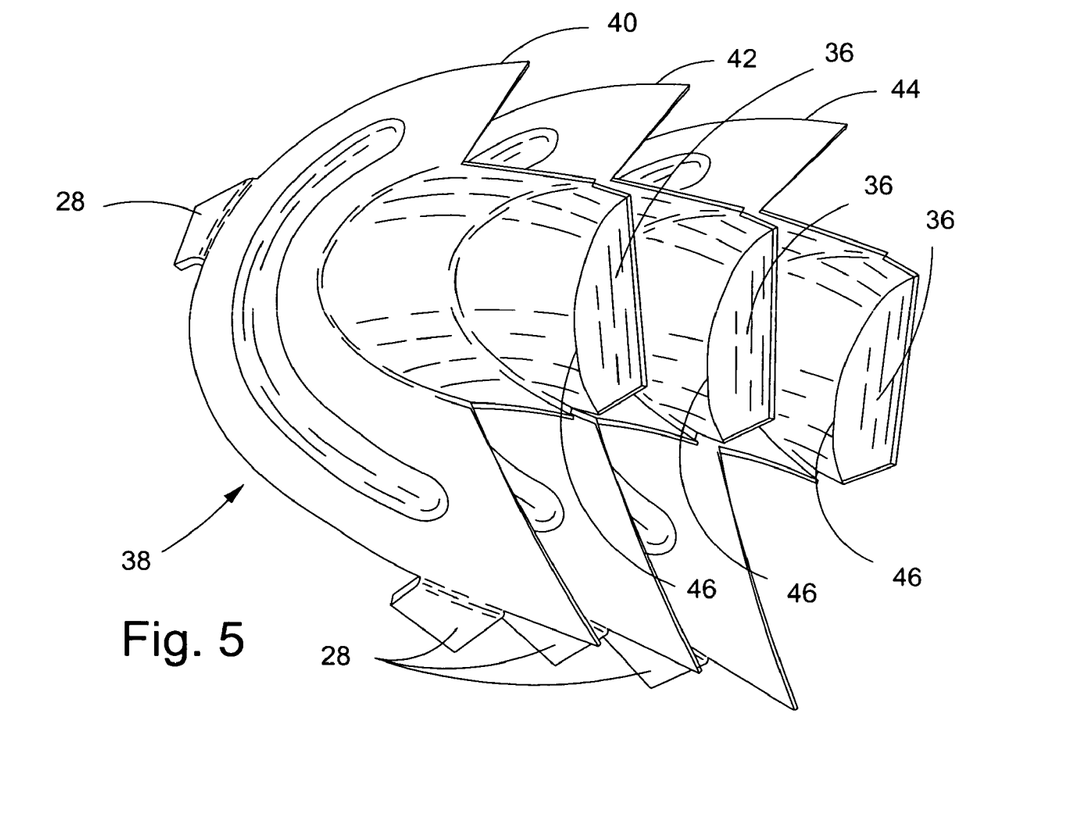
FIG. 5 is a frontal view illustrating a partially assembled turbine comprising integrated torque converter blade segments of the invention arranged in overlapped format wherein each segment is nestled against and brazed to the adjacent blade segment for uniform spacing in an early stage of turbine fabrication, and further illustrating core development from segmented structures with internal tabs as baffles for fluid coupling.

FIG. 5 illustrates a frontal view of a plurality of integrated torque converter blade-core segments 38 nestled together with each segment 40, 42 and 44 having a fluid coupling element 36. In this featured embodiment, the fluid coupling element is rounded on the bottom-edge 46 to conform with the generally rounded pattern of the turbine core.

Figure 8:
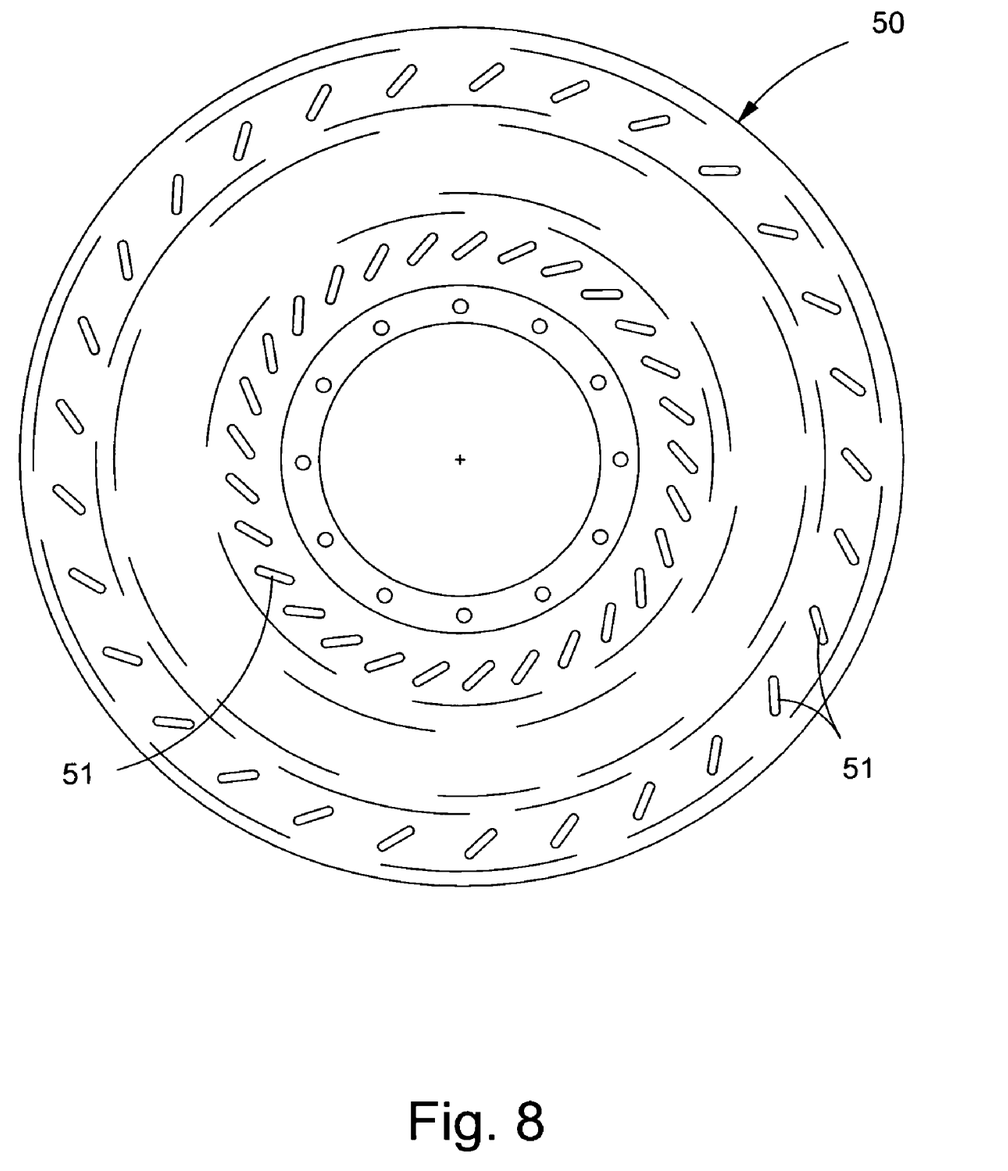
FIG. 8 is a backside view of the assembly of FIG. 7.

As previously discussed, FIG. 6 consists of a plurality of integrated torque converter blade-core segments with tabs 28 for mounting to a turbine shell (See FIG. 8). In addition, the turbine blades 20 are preferably bowed along their longitudinal axes.

Figure 7:
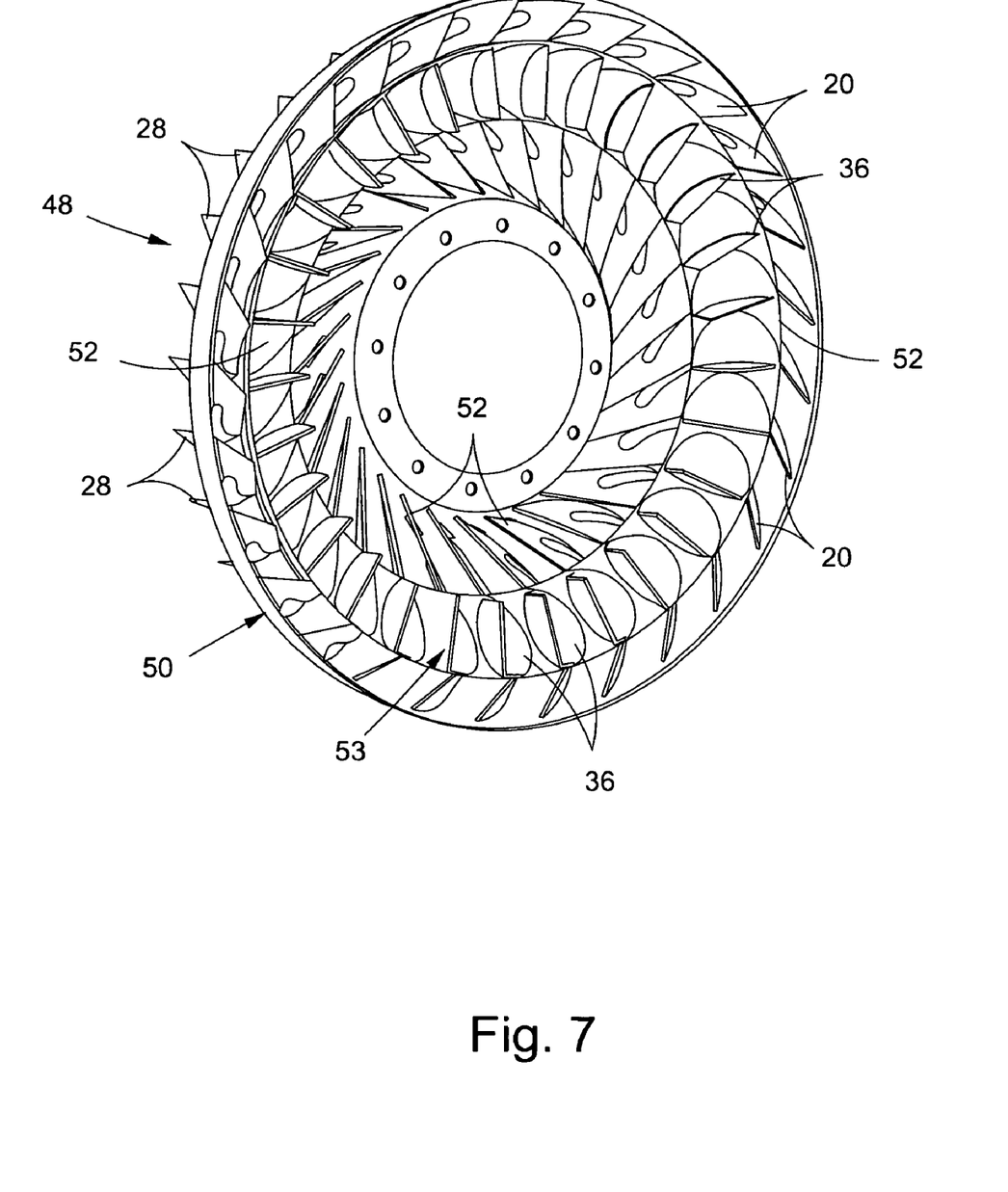
FIG. 7 is a frontal, isometric view of an integrated torque converter turbine assembly of the invention mounted in a converter shell.

FIG. 7 a frontal view of an assembled integrated torque converter turbine 48 of the invention positioned in turbine shell 50, (the latter illustrated in greater detail in FIG. 8 with tab slots 51) before tabs 28 are rolled (folded). Each torque converter blade segment comprises a bowed blade 20, wherein the core segments converge into an essentially seamless continuous structure 52 with each segment having an elevated fluid coupling tab 36 in the interior region of the incurved core.

Figure 9:
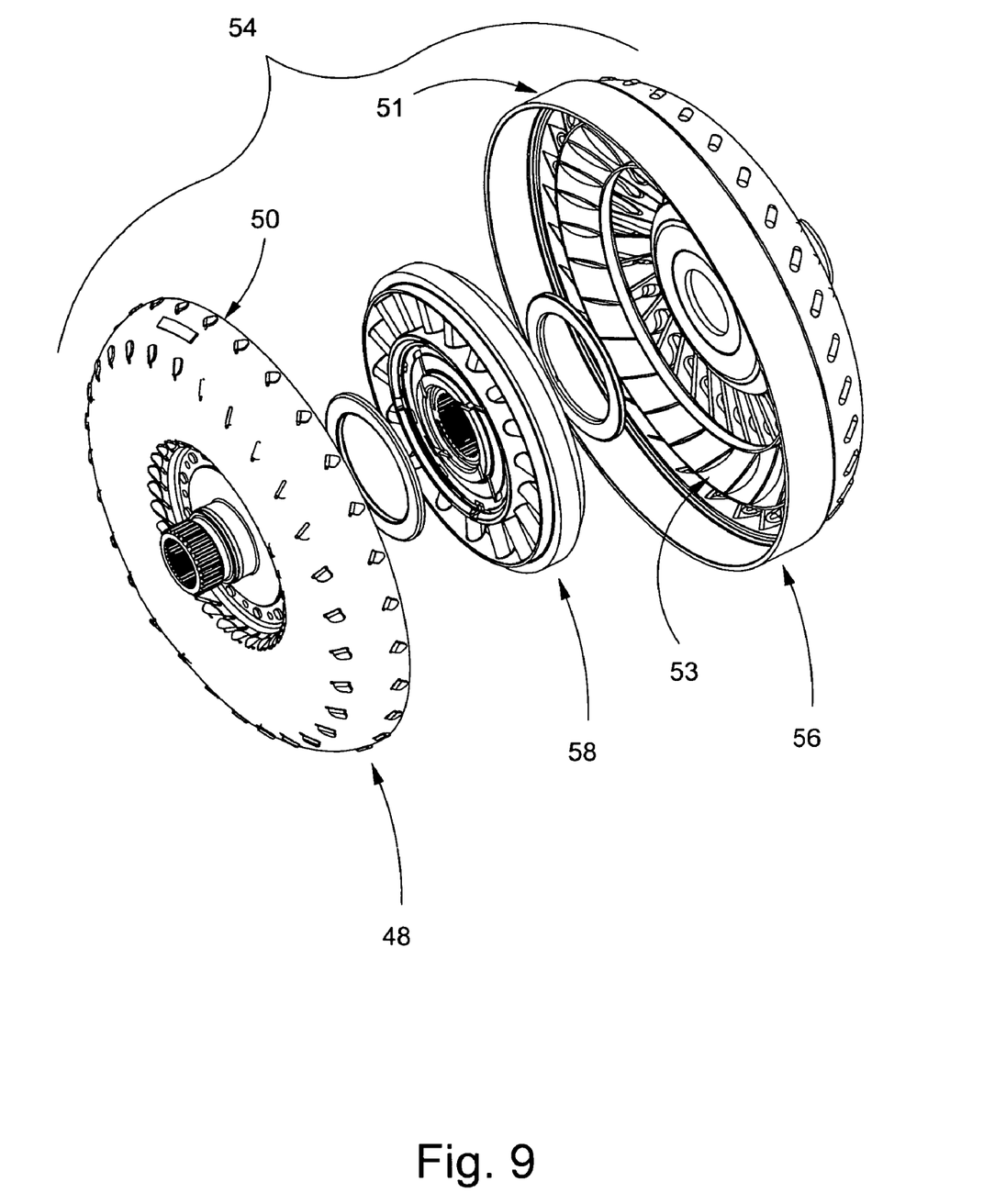
FIG. 9 is an isometric view of a torque converter of the invention with increased torque capacity shown in an exploded format to illustrate the main components of the device; and, FIG. 10 is an elevated side sectional view of an assembled torque converter equipped with the integrated turbine and impeller assemblies of the invention also illustrating the fluid coupling means in the core area.

FIG. 9 provides an exploded view of a torque converter 54 with torque converter turbine assembly 48, torque converter impeller assembly 56 and stator 58. The impeller assembly 56 is shown in perspective for a better view of impeller 53 seated in shell 51.

Figure 10:
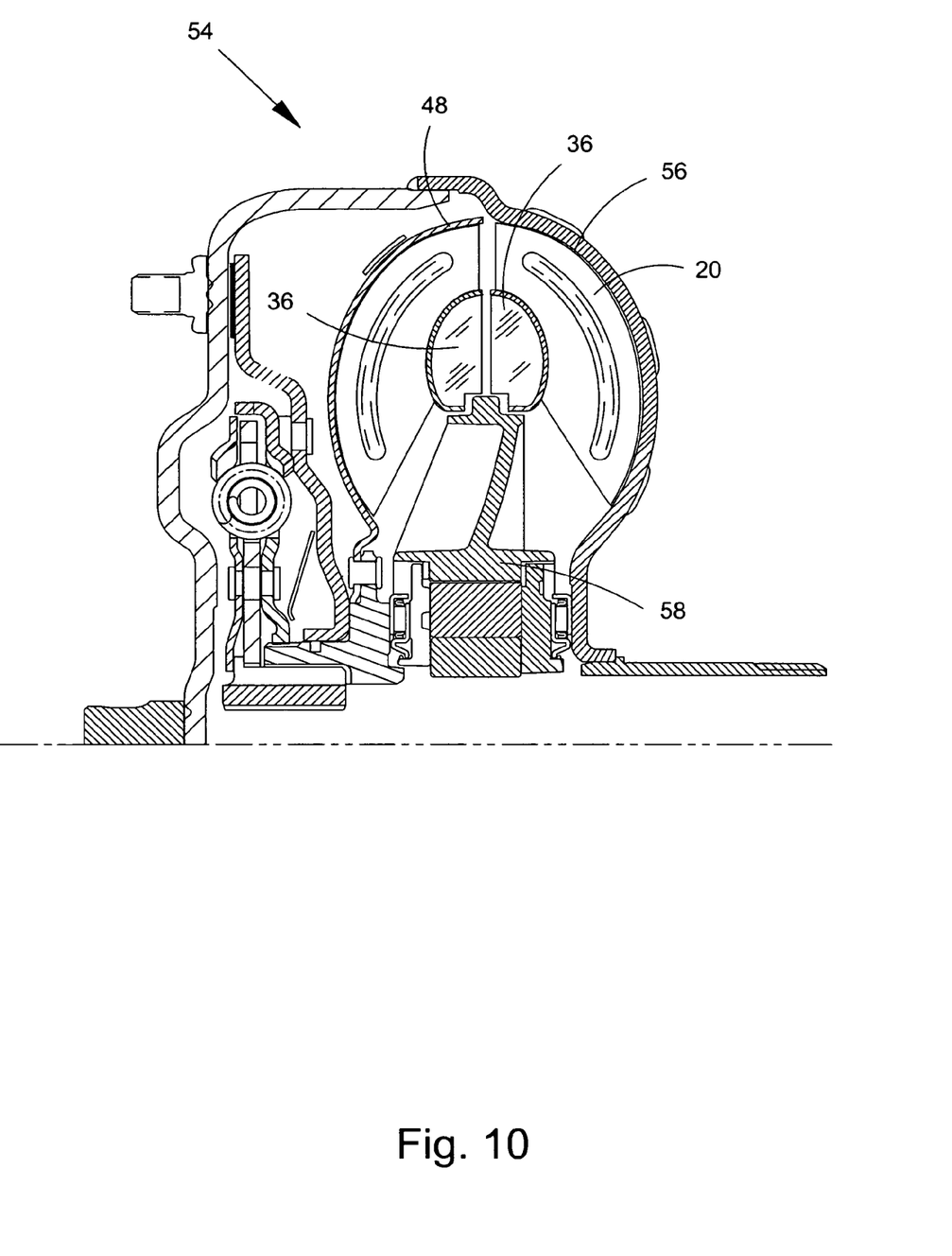

Finally, FIG. 10 provides a sectional, side elevational view of torque converter 54 of the instant invention comprising the integrated torque converter turbine 48 and impeller 56 assemblies of the invention having turbine blades/impeller blades 20 with fluid coupling tabs 36 in the core region.

What is claimed is:

1. A torque converter blade comprising a generally crescent shaped blade body having an outer convex edge, an inner concave edge, a truncated core engaged to said inner concave edge of said blade body to form a torque converter blade segment, and at least one tab for engagement with a torque converter shell, wherein said truncated core of said torque converter blade segment is incurved and comprises means for effecting fluid coupling.

2. The torque converter blade according to claim 1, wherein said means for effecting fluid coupling by said torque converter blade segment comprises a baffle member.

3. The torque converter blade according to claim 2, wherein said baffle member is positioned in said incurved area of said torque converter blade segment and is integral therewith.

4. A torque converter turbine comprising a plurality of torque converter blade segments according to claim 1, wherein adjacent segments are adjoined through their truncated cores to form a turbine core ring.

5. A torque converter pump comprising a plurality of torque converter blades according to claim 1, wherein adjacent segments are adjoined through their truncated cores to form a pump core ring.

6. A torque converter comprising at least a turbine assembly and a converter pump, said turbine assembly and converter pump comprising:

a plurality of pump blade segments, each pump blade segment including a generally crescent shaped blade body portion with outer and inner convex edges, and a core portion engaged to said inner concave edge of said blade body, wherein the plurality of pump blade segments are joined through the core portions for the plurality of pump blade segments to form a pump core ring;

a plurality of turbine blade segments, each turbine blade segment including a generally crescent shaped blade body portion with outer and inner convex edges, and a core portion engaged to said inner concave edge of said blade body, wherein the plurality of turbine blade segments are joined through the core portions for the plurality of turbine blade segments to form a turbine core ring; and, a plurality of fluid coupling elements, wherein each fluid coupling element is connected to only one of a core portion from the plurality of pump blade segments or a core portion from the plurality of turbine blade segments and wherein each core portion from the plurality of pump blade and turbine blade segments is connected to a respective fluid coupling element or wherein less than all of the core portions from the plurality of pump blade and turbine blade segments are connected to respective fluid coupling elements.

7. The torque converter according to claim 6, wherein said truncated cores of said blade segments are incurved and comprise means for effecting fluid coupling.

8. The torque converter according to claim 7, wherein said means for effecting fluid coupling comprises a baffle member.

9. The torque converter according to claim 8, wherein said baffle member is positioned in said incurved area and is integral therewith.

* * * * *